United States Patent
Wengrowski et al.

(10) Patent No.: US 11,790,475 B2
(45) Date of Patent: Oct. 17, 2023

(54) LIGHT-FIELD MESSAGING TO EMBED A HIDDEN MESSAGE INTO A CARRIER

(71) Applicant: Rutgers, The State University of New Jersey, New Brunswick, NJ (US)

(72) Inventors: Eric Wengrowski, Irvine, CA (US); Kristin Dana, Spring Lake, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 18 days.

(21) Appl. No.: 17/617,559

(22) PCT Filed: Jun. 10, 2020

(86) PCT No.: PCT/US2020/036925
§ 371 (c)(1),
(2) Date: Dec. 8, 2021

(87) PCT Pub. No.: WO2020/251976
PCT Pub. Date: Dec. 17, 2020

(65) Prior Publication Data
US 2022/0261944 A1 Aug. 18, 2022

Related U.S. Application Data

(60) Provisional application No. 62/860,438, filed on Jun. 12, 2019.

(51) Int. Cl.
*G06T 1/00* (2006.01)
(52) U.S. Cl.
CPC .... *G06T 1/0028* (2013.01); *G06T 2201/0051* (2013.01); *G06T 2201/0065* (2013.01)
(58) Field of Classification Search
CPC ........... G06T 1/0028; G06T 2201/0051; G06T 2201/0065; G06T 2201/0083; G06T 1/005
See application file for complete search history.

(56) References Cited

U.S. PATENT DOCUMENTS

| 2004/0139464 A1* | 7/2004 | Ellis | H04N 21/47 348/E7.071 |
| 2020/0184592 A1* | 6/2020 | Baluja | G06T 1/0021 |

FOREIGN PATENT DOCUMENTS

WO  WO 2018/212811 A1  11/2018

OTHER PUBLICATIONS

"Optimal Radiometric Calibration for Camera-Display Communication" by Wengrowski et al.—2016 IEEE Winter Conference on Applications of Computer Vision (WACV), IEEE, 2016, (Year: 2016).*

(Continued)

*Primary Examiner* — Christopher Wait
(74) *Attorney, Agent, or Firm* — Leason Ellis LLP (57) ABSTRACT

A method of light messaging, in which a hidden message is transmitted via coded image emitted from a display device and retrieved using a camera, comprises training a camera-display transfer model that receives images with hidden messages from an embedding model and generates modified coded images based on training data that accounts for properties of displays and cameras, the modified coded images delivered to a recovery model that decodes the hidden messages and outputs hidden message determinations, training both the embedding and recovery models using the CDTF model and training data to minimize differences between the input hidden messages and the hidden message determinations. After training the CDTF model and other models, embedding a hidden message in a carrier image using the embedding model, displaying the coded image using the display device, receiving the coded image at the camera, and retrieving the hidden message using the recovery model.

20 Claims, 6 Drawing Sheets

(56) References Cited

OTHER PUBLICATIONS

International Search Report and Written Opinion in corresponding PCT Application No. PCT/US2020/036925, dated Sep. 16, 2020.
Wengrowski, Eric, et al. Optimal radiometric calibration for camera display communication, 2016 IEEE Winter Conference on Applications of Computer Vision (WACV), IEEE, 2016, [retrieved on Aug. 31, 2020) Retrieved from the Internet <URL: http://ericwengrowski.com/wp-content/uploads/2014/11/optimal-radiometric-calibration_final.pdf>entire (especially abstract, p. 1, col. 1 to col. 1; pg., col. 1 to col. 2; Fig. 7, p. 6).

\* cited by examiner

LIGHT-FIELD MESSAGING TO EMBED A HIDDEN MESSAGE INTO A CARRIER

CROSS-REFERENCE TO RELATED PATENT APPLICATIONS

This application is a U.S. National Phase Application under 35 U.S.C. § 371 of International Patent Application No. PCT/US2020/036925, filed Jun. 10, 2020, and claims the benefit of priority under 35 U.S.C. Section 119(e) of U.S. Application No. 62/860,438, filed Jun. 12, 2019, all of which are incorporated by reference in their entireties. The International Application was published on Dec. 17, 2020 as International Publication No. WO 2020/251976 A1.

FIELD OF THE DISCLOSURE

The present disclosure relates to embedding hidden information in data communications, and, more particularly, relates to a method for embedding and retrieving steganographically concealed information in electronically displayed images and videos by light field messaging (LFM).

BACKGROUND OF THE DISCLOSURE

In Light Field Messaging, hidden information is embedded in images or videos (collectively referred to herein as "images") displayed by electronic devices and cameras capture the images. Illumination from the displayed image on an electronic screen is a source of a light in free space that can be characterized by a light field. The camera captures the image by sampling this light field. The exact position and orientation of the camera is unknown and not fixed within the 3D space. The received images and videos are then decoded algorithmically using a processor co-located on the camera or in a separate device to retrieve the information embedded therein. For this reason, light field messaging is sometimes referred to as screen-camera communication (it is also referred to as visible light messaging, camera-display messaging). There are numerous applications for visually concealed information such as interactive visual media, augmented reality, road signage for self-driving vehicles, hidden tags for robotics and objects, and private communications.

When hidden information is captured from an on-screen image using a camera, the task of decoding is different from that of traditional steganography. Steganography has conventionally concerned the digital domain in which images are processed and transferred as digital signals. The early work of digital steganography can be divided into spatial and transform techniques. Spatial techniques range from simple alteration of least significant intensity bits (LSB) to more sophisticated fixed-filter transform domain techniques and to learned filters using deep networks Small variations in pixel values are difficult to detect visually and can be used to store relatively large amount of information. In practice, simple LSB steganography is not commonly used, but more sophisticated LSB methods can be used in conjunction with image compression to achieve better undetectability. Transform domain techniques embed using filtered signals and messages so that the embedded messages are hidden to visual observation. However, both spatial and transform techniques are not robust with respect to the light-transmission in light field messaging.

More recently, machine learning techniques, including deep convolutional neural networks, have been applied in digital image steganography. Investigators have demonstrated that deep learning using jointly learned features and classifiers often outperforms more established methods of steganography analysis that employ hand selected image features. Additionally, structured neural learning approaches have been explored that integrate conventional spatial and transform domain steganography techniques, such as LSB selection in a carrier image for a text-based message.

For example, Baluj a has disclosed deep feed-forward convolutional neural networks that can directly learn feature representations to embed a message image into a carrier image. Rather than constraining the network to select pixels in a carrier image suitable for embedding, the neural networks are trained with constraints that preserve carrier and message image quality. See S. Baluja, "*Hiding images in plain sight: Deep steganography*" in Advances in Neural Information Processing Systems, pp. 2006-2076 (2017). Hayes et al. have disclosed a similar steganography algorithm based on deep neural networks that utilize adversarial learning to preserve the quality of the carrier image and limit hidden message detection. J. Hayes and G. Danezis, "*Generating steganographic images via adversarial training*" in Advances in Neural Information Processing Systems, pp. 1951-1960 (2017). However, these and similar techniques also address digital steganography and also do not perform as well when applied to photographic steganography and light-field messaging.

Figure 1:
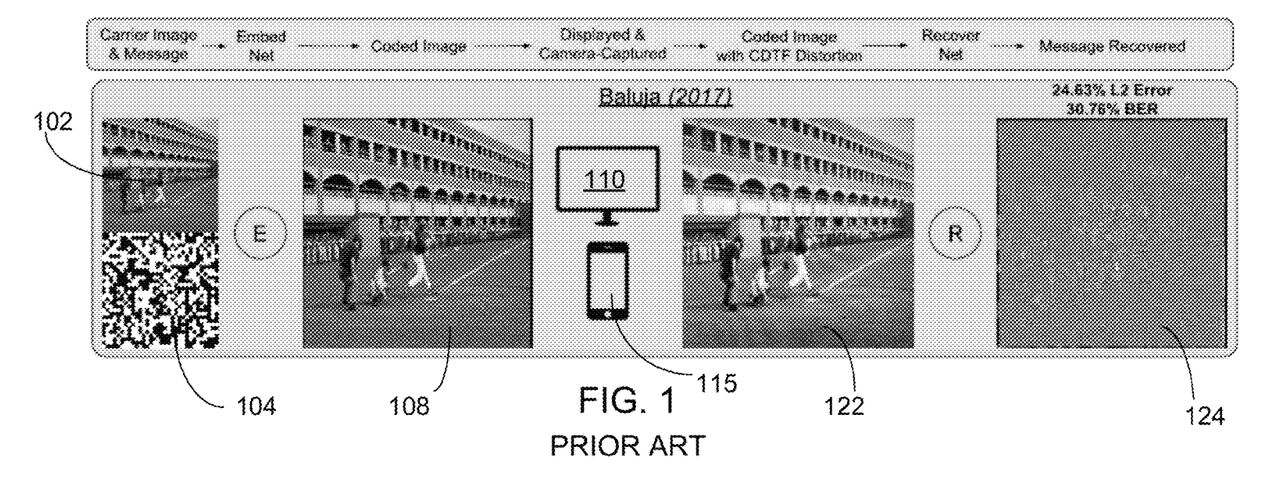
FIG. 1 is a schematic illustration of a digital steganography technique disclosed in the prior art.

FIG. 1 is a schematic illustration of a recently disclosed digital steganography technique. FIG. 1 shows an exemplary carrier image 102 and an exemplary 2-dimensional pattern that encodes a message 104. The message 104 is embedded into the carrier image, transforming the carrier image into a coded image 108. The coded image is displayed on an electronic display screen 110, and the display coded image is captured using a camera 115. The transfer from the display screen to the camera is referred to as the camera-display transfer (CDT) and is characterized by a camera-display transfer function (CDTF). The transfer has a distorting effect that tends to corrupt or destroy the information steganographically encoded in the camera image. In FIG. 1, while the captured coded image 122 looks similar to the displayed coded image 108, the message recovered 124 does not at all resemble the original message 104 due to the effects of the camera-display transfer.

In the field of light field messaging and visible light communication specifically, early systems concentrated on the screen-camera transfer and did not seek to hide a signal in a display image. In computational photography, single-channel systems have been developed that generate optimal patterns for project-camera systems. In the computer vision field, communication of hidden information in displayed image started with Pixnet and visual MIMO and has continued in other recent work such as InFrame and DisCo. In these dual-channel methods, the display conveys hidden messages independently from the visible images through camera-capture video. In prior methods, the message has been embedded using fixed filter techniques including multiresolution spatial embedding or temporal embedding that requires high-frequency displays and high-speed cameras to take advantage of human perception limitations. It has been found that these light-messaging techniques suffer in terms of performance due to camera-display transfer effects, perceptible artifacts from the hidden message, and issues synchronizing electronic displays and cameras.

What is therefore needed is a light-field messaging method that does not rely on temporal changes to separate the hidden message from the coded image because these techniques require temporal synchronization between cameras and displays.

SUMMARY OF THE DISCLOSURE

Disclosed herein is a method of light messaging in which a hidden message is transmitted in a coded image that is emitted from a display device and captured by a camera. The camera-captured version of the coded image is processed to retrieve the message. The method comprises learning a function to approximate the effects of camera display transfer. In some embodiments, the function is implemented as a camera-display transfer function model that receives images coded with hidden messages from an embedding model and generates modified coded images that simulate camera-display distortion based upon training image data, the modified coded images being delivered to a recovery model that is configured to decode the hidden messages from the modified coded images and to output hidden message determinations, training both the embedding model and the recovery model using the prior-trained CDTF model and the training image data to minimize a difference between the input hidden messages and the hidden message determinations, after training the CDTF, embedding and recovery models: embedding a further hidden message in a carrier image using the trained embedding model, transforming the carrier image into a coded image, displaying the coded image using the display device, receiving the coded image at the camera, and retrieving the further hidden message embedded in the coded image using the trained recovery model.

In certain embodiments, the CDTF model is trained using a loss function that includes a perceptual loss regularizer.

In further embodiments, the training image data includes photographs taken by a plurality of cameras that vary both in camera type as well as camera position/orientation. The training image data can also include images displayed on a plurality of display devices. The data was collected under a variety of illumination and exposure conditions. It is noted however, that after the models are trained, the model can be used with different camera/display combinations than those used in the training image data.

In certain embodiments, the embedding model includes a first processing path for the message and a second processing path for carrier images into which the hidden messages are embedded. In certain implementations, features of the carrier images and messages are shared by the first and second processing paths.

A method of light messaging using a camera-display distortion model includes an embedding model configured to embed a hidden message into a carrier image and transform the carrier image into a coded image, a camera-display transfer function model configured to receive the coded image from the embedding model and to generate a modified coded image that simulate camera-display distortion based upon training image data, and a recovery model configured to retrieve the hidden message from the modified coded image. The method comprises receiving an image emitted by a display device in which a message has been embedded using the embedding model trained with the CDTF model, processing the received image through the recovery model trained with the CDTF model, and determining the hidden message.

In addition a further method of light messaging is provided in which an embedding model is configured to embed a hidden message into a carrier image and transform the carrier image into a coded image, a camera-display transfer function model is configured to receive the coded image from the embedding model and to generate a modified coded image that simulate camera-display distortion based upon training image data, and a recovery model configured to retrieve the hidden message from the modified coded image. The method comprises embedding a further hidden message in a carrier image using the embedding model trained with the CDTF model, transforming the carrier image into a coded image, and displaying the coded image using a display device.

These and other aspects, features, and advantages can be appreciated from the following description of certain embodiments of the invention and the accompanying drawing figures and claims.

DESCRIPTION OF CERTAIN EMBODIMENTS OF THE DISCLOSURE

As used herein the term "hidden message" refers to the covertly communicated payload and can include any type of information without limitation. The term "carrier image" refers to the image that is used to hide the message, and a "coded image" refers to the combined carrier image and hidden message. The term "image" throughout is meant to include both static images and video frames.

Disclosed herein are methods of end-to-end photographic light field messaging. Embodiments of the method include provision of a camera-display transfer function that models the camera and display without radiometric calibration, an embedding model that optimally embeds the message within an image, and a message recovery model that retrieves the message on the camera side. The camera-display transfer function can be implemented in a number of different ways using machine learning technique, including neural networks. In some embodiments, multiple camera-display transfer functions that work together can be implemented. Additionally, in certain embodiments the embedding model and the recovery model can be implemented using neural networks. Single-frame operation can be employed so that no temporal synchronization between camera and display is needed, greatly increasing the practical utility of the method. The properties of the camera hardware, display hardware, and radiometry need not be known beforehand. Instead, a training camera-display dataset ("CD dataset") is compiled. In one implementation, a rich CD dataset with over one million images and 25 camera-display pairs has been used to train a neural network to learn the representative CDTF. The embedding and recovery models are trained after establishing a robust CDTF model. In some implementations, the CDTF is modeled using a neural network algorithm that learns which features are invariant to CDTF distortion, while simultaneously preserving perceptual quality of the carrier image.

Figure 2:
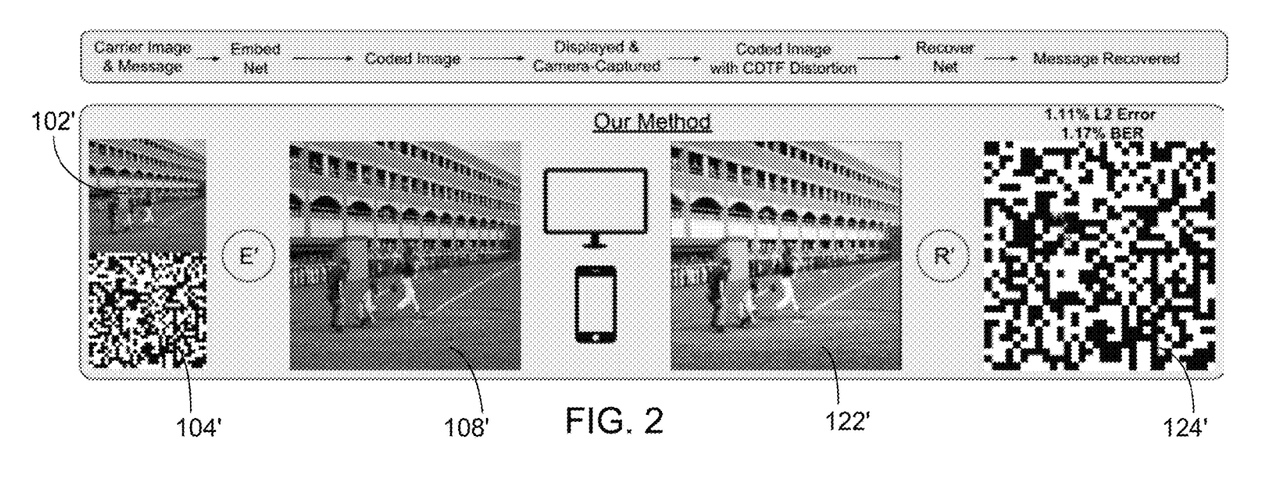
FIG. 2 is a high-level overview of a light messaging method according to the present disclosure.

FIG. 2 is a high-level overview of an embodiment of a light messaging method according to the present disclosure. A 2-dimensional pattern that encodes a message 104' is embedded in a carrier image 102', creating a coded image 108'. Unlike the method shown in FIG. 1, in the method of FIG. 2, an embedding model (E') used to embed the message includes a model of the camera-display transfer function (CDTF) in its training pipeline. After the message is displayed on device 110' and a captured coded image 122' is obtained with camera 115', a recovery model (R'), which also includes a model of the CDTF in the training pipeline, is used to retrieve the message 124'. The message 124' accurately reproduces the original message 104' because the trained embedding and recovery models (E', R') are robust to CDTF distortion.

It is noted the embedding and recovery models need not be trained first using a CDTF model. Rather, in such embodiments, the embedding and recovery models using display/camera image pairs so that the embedding and recovery models themselves incorporate a CDTF transfer function. Furthermore, rather than using a model to simulate camera-display distortions, the embedding and recovery models can be trained inversely to incorporate an "inverse" function that effectively reverses the effects of camera-display distortion. Accordingly, the manner in which camera-display distortion is modeled and then reversed can be implemented in a number of different ways an in different orders as would be appreciated by those of skill in the art.

Figure 3:
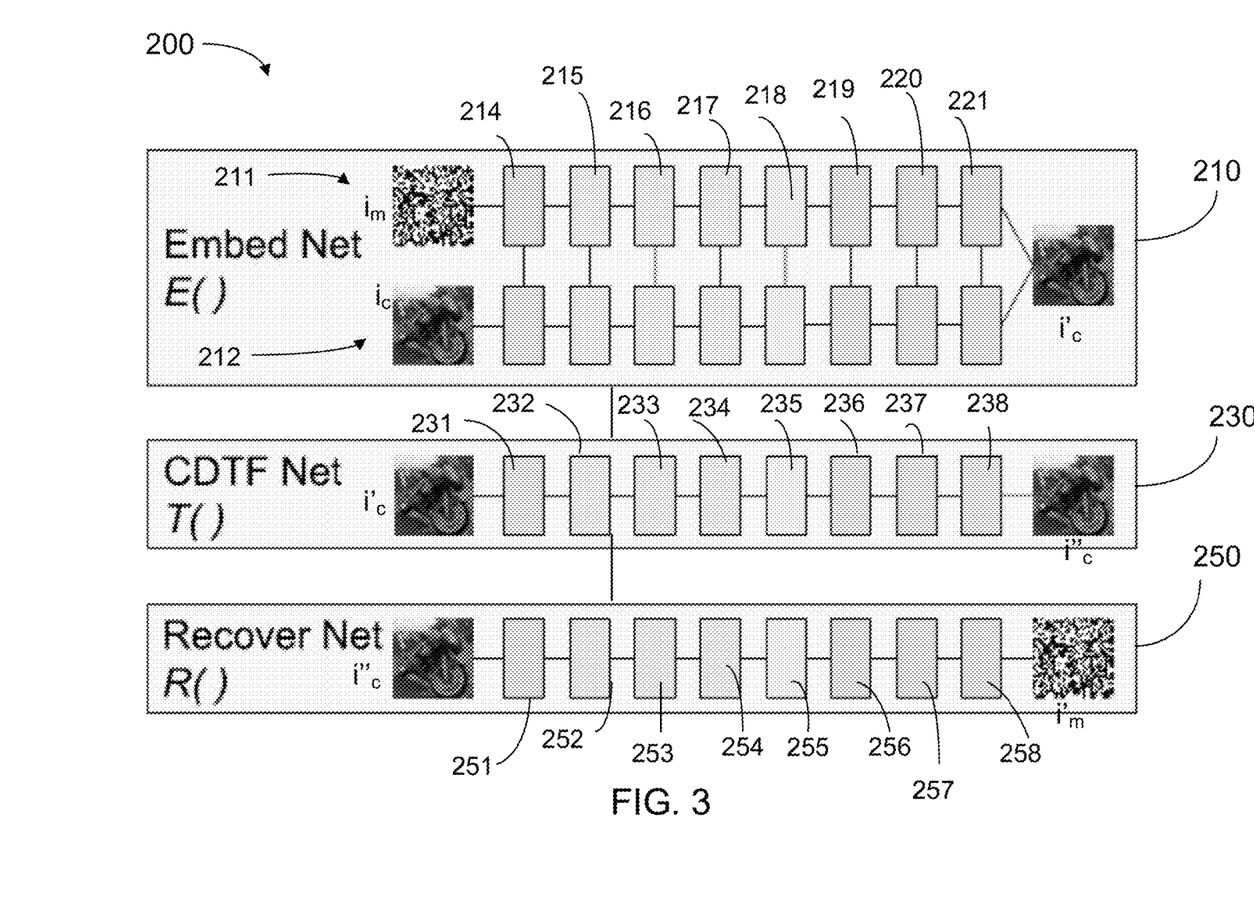
FIG. 3 is a schematic diagram of an embodiment of a system used to implement light field messaging according to the present disclosure.

FIG. 3 is a schematic diagram of an embodiment of a system used to implement light field messaging according to the present disclosure. The system 200 includes an embedding model 210 that is adapted for embedding (hiding) messages in carrier images and generating coded images. In the embodiment shown, a camera-display transfer (CDTF) model is implemented as a neural network 230 which is adapted to simulate the distorting effects of camera-display transfer, and a recovery model 250 is adapted for recovering messages from coded images. In terms of functional notation, the embedding model is represented as E( ), the recovery model as R( ) and the CDTF model as T( ).

The unaltered carrier image is denoted as $i_c$, the unaltered message as $i_m$, the coded image as $i'_c$ and the recovered message as $i'_m$. $L_c$ and $L_m$ represent generic norm functions used for image and message loss that may be scaled to change their relative weighting, respectively. In theory, the objective is to learn functions E( ) and R( ) that minimize $$L_c(i'_c - i_c) + L_m(i'_m - i_m) \qquad (1)$$

subject to $$E(i_c, i_m) = i'_c \qquad (2) \text{ and}$$

$$R(i'_c) = i'_m \qquad (3)$$

In other words, the objective is to simultaneously minimize the distortions to the carrier image and minimize message recover error. It turns out that this simple formulation does not yield a trained solution. Instead, an additional function T( ) that simulates CDTF distortion is added. If $i''_c$ represents a coded image that has passed through a display-camera transfer T( ), then $$T(i'_c) = i''_c \qquad (4)$$

The conditions for minimizing the loss function from (1) are now:

$$E(i_c, i_m) = i'_c, \; T(i'_c) = i''_c \qquad (5), \text{ and}$$

$$R(i''_c) = i'_m \qquad (6)$$

Figure 4:
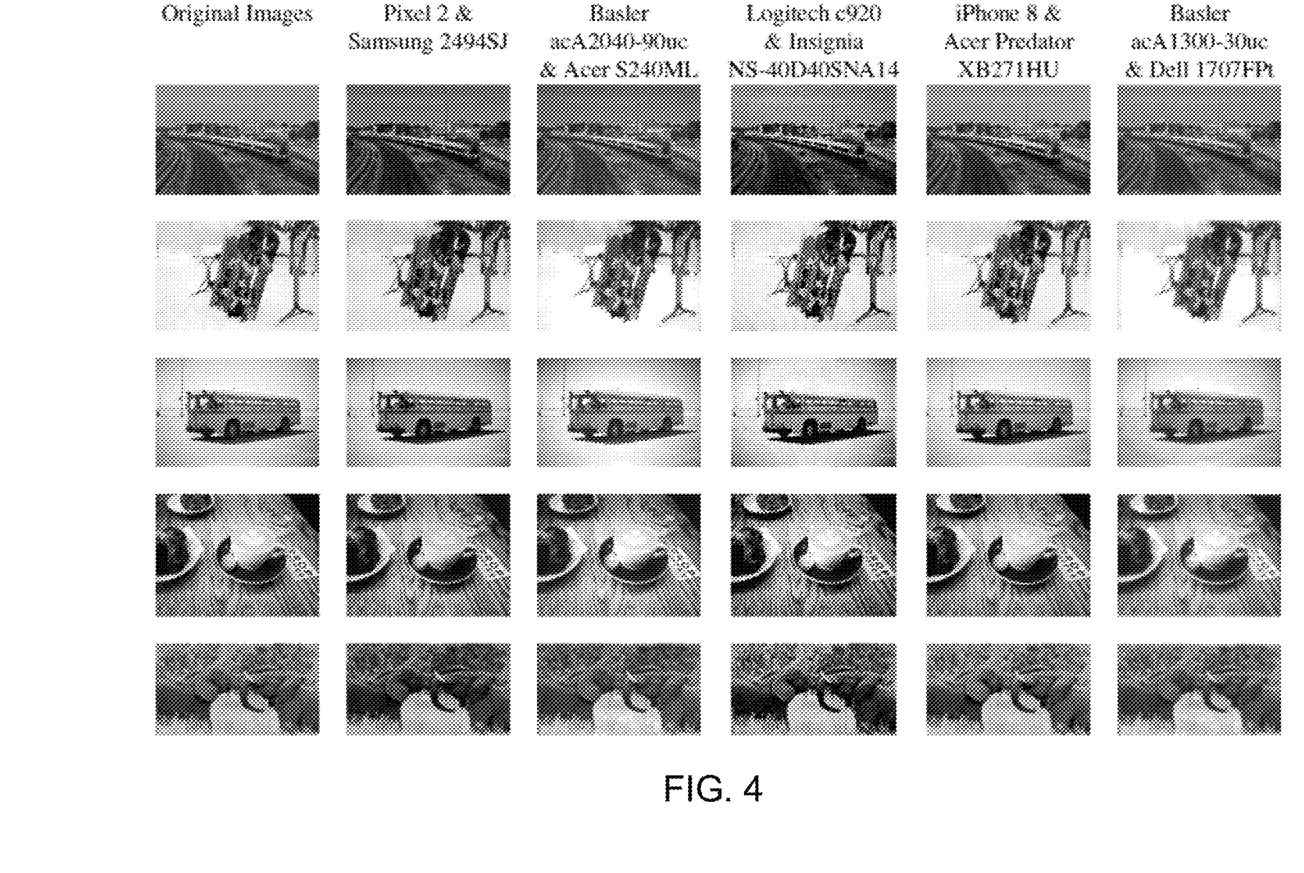
FIG. 4 is a table showing images obtained using multiple camera-display pairings used to construct the dataset to train the CDTF network function.

The CDTF function T( ) represents both the photometric and radiometric effects of camera-display transfer. T( ) is trained using a large dataset of images electronically-displayed and camera-captured using several combinations of displays and cameras. FIG. 4 is a table showing example images obtained using multiple camera-display pairings. The first column includes original five photographic images. The second column includes the same original images when displayed by a Samsung 2494SJ monitor and captured by a Pixel 2 camera; the third column includes the original images when displayed on an Acer S240ML monitor and captured by a Basler acA2040-90uc camera; the fourth column includes the original images when displayed on an Insignia NS-40D40SNA 14 monitor and captured by a Logitech c920 camera; the fifth column includes the original images when displayed on an Acer Predator XB271HU monitor and captured by an iPhone 8 camera; and the sixth column includes the original images when displayed on a Dell 1707FPt monitor and captured by a Basler acA1300-30uc camera. While the table shows 30 images taken from display-camera pairings, the image set used to train the CDTF model in practice includes 1 million images collected from 25 display-camera pairs. Camera properties (spectral sensitivity, radiometric function, spatial sensor pattern) and display properties (spatial emitter pattern, spectral emittance function) cause the same image to appear significantly different when displayed and captured using different display-camera hardware.

Returning again to FIG. 3, in the depicted embodiment, the embedding model 210, CDTF model 230, and recovery model 250 include dense blocks with feature maps at different scales in the shape of U-Net. The embedding model 210 can comprise a "Siamese" architecture having a first portion 211 that receives and directly processes the carrier image ($i_c$), and a second portion 212 that receives and directly processes the message ($i_m$). However, this is merely one implementation and not required. In the depicted embodiment, the two portions 211, 212 are linked, share features, and combine to generate the coded image output ($i'_c$). The output of each pair of blocks in the portions 211, 212 can be concatenated and passed to subsequent blocks. Each portion 211, 212 includes a plurality of learning "blocks". In some implementations, portion 211 includes an initial block 214 which is a convolutional neural network that receives batch normalized inputs and employs a non-linear function, such as a leaky ReLU, as an activation function. The output from the initial block is received by three dense layer encoding blocks 215, 216, 217 in series. The encoding blocks have a similar convolutional neural network architecture and employ batch normalization, a non-linear activation function (e.g., leaky ReLU) as well as max pooling to reduce feature dimensionality. The last encoding block passes output to a bottom block 218 having a similar architecture to the initial block. The bottom block in turn passes output to a dense triple layer of decoding blocks 219, 220, 221 comprising a convolution transpose layer, a convolutional network layer and another convolutional transpose layer, respectively. The second portion 212 of the embedding model has a similar multi-layer architecture with initial, encoding, bottom and decoding blocks.

It is noted that different convolutional neural network architectures can also be used and that the particular convolutional network implementation described above is not to be taken as limiting. In addition, in some embodiments, the CDTF function can be implemented, without an explicitly trained network using one or more fixed functions. For example, an image could be modified using some combination of affine or perspective transformations, blurring, changes in brightness, changes in contrast, changes in color saturation, changes in hue, rotation, flipping, scaling, stretching, cropping or translation, and other combinations of image processing and computer vision functions. In these embodiments, the untrained CDTF model can be used to train embedding and/or recovery functions.

The CDTF model 230 receives coded images ($i'_c$) in an initial block 231. The output from the initial block 231 is passed to a layer of encoding blocks 232, 233, 234, then to a bottom block 235, and thereafter to a dense layer of decoding blocks 235, 236, 237. The final decoding block 238 outputs a modified coded image ($i''_c$) that models the display-camera distortion. The initial, encoding, bottom and decoding blocks 231-238 can have the same architecture as those described above in the embedding model, although this is not required. Similarly, the recovery model 250 can include an initial block that receives modified coded images ($i'_c$) in an initial block 251. The output from the initial block 251 is passed to a layer of encoding blocks 252, 253, 254, then to a bottom block 255, and thereafter to a dense layer of decoding blocks 255, 256, 257. The final decoding block 258 outputs a recovered message ($i'_m$). In some implementations, the initial, encoding, bottom and decoding blocks 251-258 can have the same architecture as those described above in the embedding and CDTF models.

The light messaging method of the present disclosure has the combined goals maximizing message recovery and minimizing carrier image distortion. For coded image fidelity, the loss function uses the L2-norm to measure the difference between $i_c$ and $i'_c$. To capture this difference, photo-realistic image generation using neural networks can employ perceptual loss metrics in training. The perceptual loss metric can also include a quality loss. In some implementations, the quality loss can be calculated by passing $i_c$ and $i'_c$ through a trained neural network for object recognition, such as VGG (Visual Geometry Group model), and minimizing the difference of feature map responses at several depths.

As noted above, to train the CDTF model (T( )), a dataset including over 1 million images collected using 25 camera-display pairs was used. Images from the MSCOCO 2014 training and validation dataset were displayed on five electronic different displays, and then photographed using five digital cameras. The chosen hardware represents a spectrum of common cameras and displays. To achieve a set of 1M images, 120,000 images of MSCOCO were chosen at random. Each camera-captured image was cropped, warped to frontal view, and aligned with its original. The measurement process was semi-automated and employed software control of all cameras and displays. The CDTF model was trained using the 1,000,000 image pairs ("1 M data set"); $i_{coco}$ represents the original images and $i_{CDTF}$ represents the same images displayed and camera-captured. The transfer function T( ) is trained to simulate CDTF distortion by inputting $i_{coco}$ and outputting $i_{CDTF}$. Thus, the loss function to minimize is:

$$T_{loss} = L_2(i_{coco} - i_{CDTF}) + \lambda_T * L_1(VGG(i_{coco}) - VGG(i_{CDTF})) \quad (7)$$

A perceptual loss regularizer for T( ) is included to preserve the visual quality of the CDTF model output ($i''_c$). The perceptual loss weight used in training can vary depending on the training data set; a value for $\lambda_T$ of 0.001 was used for training the CDTF model with the 1 M data set. T( ) was trained for 2 epochs using the Adam optimizer with a learning rate of 0.001, with betas equal to (0.9,0.999) and no weight decay. The total training time was 7 days.

The embedding and recovery models were trained simultaneously using 123,287 images from MS-COCO for $i_c$ and 123,282 messages for $i_m$. The loss function for E( ) effectively minimized the difference between the coded image and the original image while encoding information from $i_m$ such that it is robust to CDTF. The loss function for R( ) was minimized to recover all information in $i_m$ despite CDTF distortion.

$$E_{loss} = L_2(i_c - i'_c) + \lambda_E * L_1(VGG(i_c) - VGG(i'_c)) \quad (8)$$

$$R_{loss} = \phi * L_1(i_m - i'_m) \quad (9)$$

A perceptual loss regularizer can also been included in the loss function for E( ) to preserve the visual quality of the embedding model output $i'_c$. The loss weight used in training ($\lambda_E$) was 0.001, and the message weight ($\phi$) was 128. Both the embedding and recovery models were trained for 3 epochs using the Adam optimizer with a learning rate of 0.001, betas equal to (0.9,0.999) and no weight decay. The total learning time for the embedding and recovery models was 8 hours. The embedding, CDTF and recovery models were all trained using PyTorch 0.3.0 with a Nvidia Titan X (Maxwell) computing card.

The efficacy of the training method was explored by experimentation. Tests were performed using a benchmark test data set with 1000 images from the MSCOCO image set, 1000 messages, and 5 camera-display pairs. Each message contained 1024 bits. Two videos were generated, each containing 1000 coded images embedded using the trained light field message method; in one test, the messages were recovered using the full model trained with the CDTF model. In another test, the embedding and recovery models were used without prior training with the CDTF model. In a further test, the full embedding and recovery model trained with the CDTF model was tested with data captured by cameras at a 45° angle to the display. Table 1 shows incudes the bit error rate (BER) results of the testing using the benchmark data. The light fielding messaging method trained with T( ) achieved a 7.3737% bit error rate, or 92.6263% correctly recovered bits on average for frontally photographed displays. The same model achieved a 14.0809% BER when camera and display were aligned at a 45° angle. All BER results were generated without any error correcting codes or radiometric calibration between cameras and displays. Redundancy and error correction coding can be used to reduce this bit error rate further.

TABLE 1

|  | Pixel 2 & Samsung 2494SJ | Basler acA2040-90uc & Acer S240ML | Logitech & Insignia S-40D40SNA14 | iPhone * & Acer Predator XB271HU | Basler acA1300-30uc & Dell 1707FPt |
|---|---|---|---|---|---|
| LFM, without T( ), frontal | 49.961% | 50.138% | 50.047% | 50.108% | 50.042% |
| LFM, with T( ), 45° angle | 29.807% | 15.229% | 10.217% | 5.1415% | 10.01% |
| LFM, with T( ), frontal | 10.051% | 6.5809% | 10.333% | 5.0732% | 4.8305% |

Figure 5:
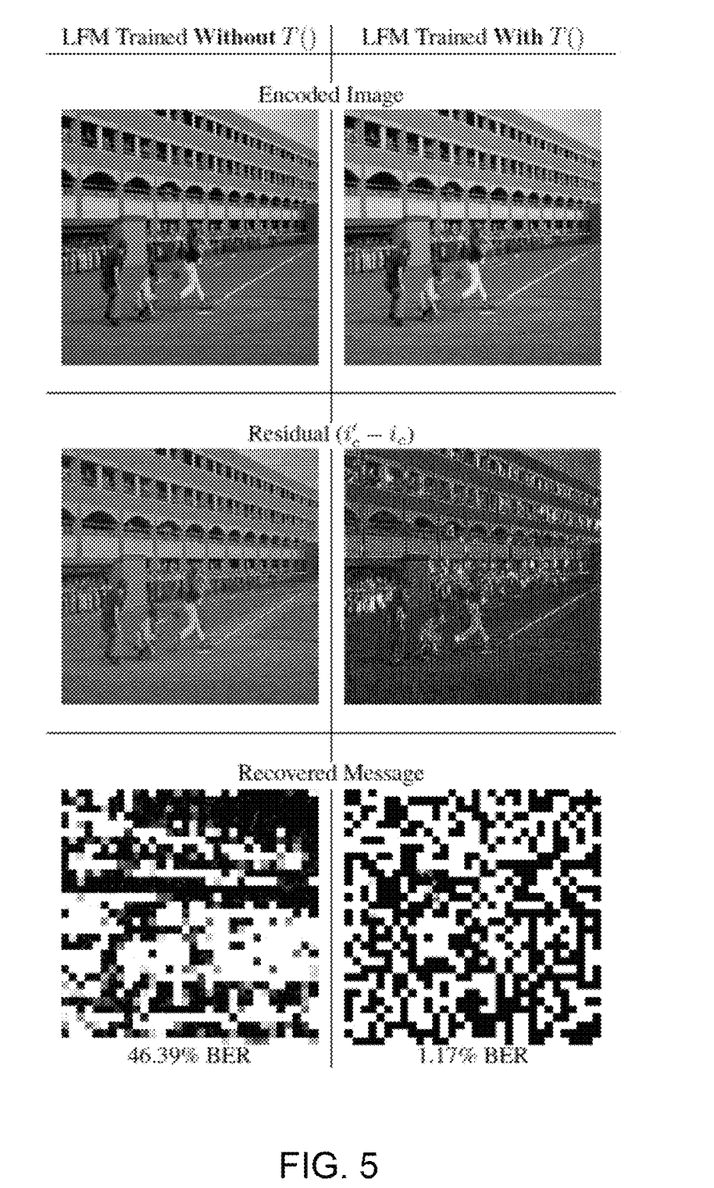
FIG. 5 illustrates the differences in results between the front tests trained with T ( ) with and without T ( ).

FIG. 5 illustrates the differences in results between the front tests trained with T ( ) with and without T ( ). Example coded images (i'$_c$), residuals (i'$_c$−i$_c$), i.e., the difference between the coded image and the original carrier image, and recovered messages (i'm), for the two test cases are shown. As can be discerned, the recovered image has much greater message fidelity when display-camera distortion is accounted for using T ( ). Similarly, the residuals are also quite different in the two cases, showing how the training system as a whole anticipates the effects of display-camera distortion by altering the coded message. Without T ( ), the message is encoded as small per-pixel changes that are near-uniform across the image. With T ( ), the message is encoded as patches where the magnitude of pixel changes varies spatially.

Figure 6:
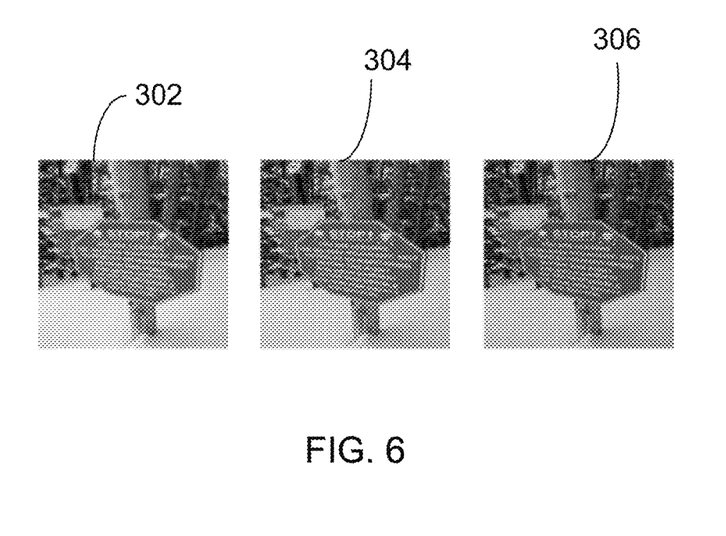
FIG. 6 depicts examples of coded images obtained using $\lambda_T$ values of 0.0, 0.001, and 0.01, respectively.
Figure 7:
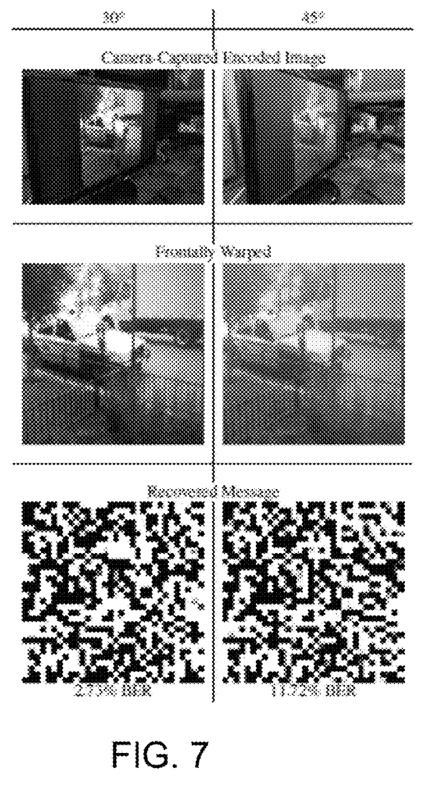
FIG. 7 shows message recovery results for capturing two different images with the same display-camera pair with the images captured with the display-camera pair at both 30° and 45° angles.
Figure 8:
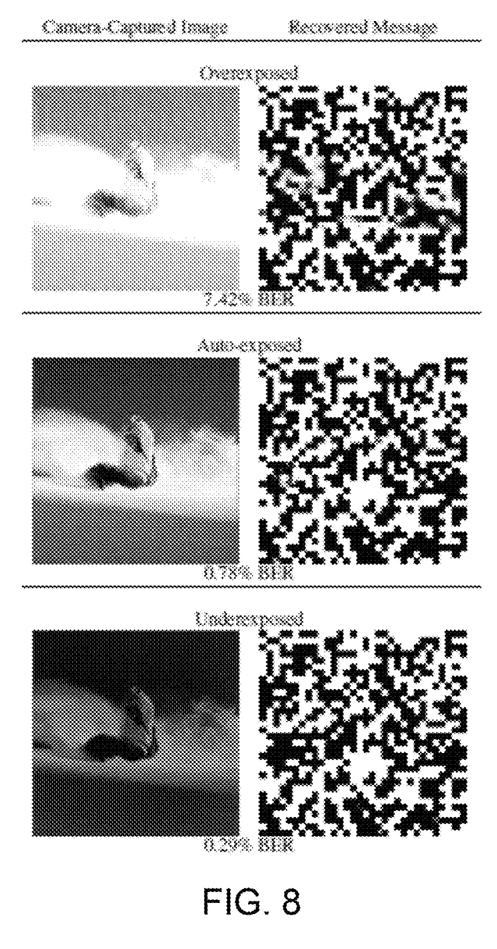
FIG. 8 illustrates results of an empirical sensitivity analysis of camera exposure settings.

Further tests were performed to gain insight into the effects of varying different metrics on the disclosed LFM steganography model. In one test, the perceptual regularizer weight ($\lambda_T$) in the loss function for T ( ) was varied. FIG. 6 depicts examples of coded images 302, 304, 306 obtained using $\lambda_T$ values of 0.0, 0.001, and 0.01, respectively. As the perceptual quality metric $\lambda_T$ is increased, the image becomes sharper and has fewer color shift errors. However, when $\lambda_T$ becomes too large, the bit error rate for message recovery increases, as is the case when $\lambda_T$ is 0.01. FIG. 7 shows results for capturing two different images with the same display-camera pair but with the images captured with the display-camera pair at both 30° and 45° angles. The disclosed LFM model performs well for oblique views but experiences a drop-off in performance from a 2.73% BER to a 11.72% BER with the increase in angle from 30° to 45°. FIG. 8 illustrates results of an empirical sensitivity analysis of camera exposure settings. The test was performed using an Acer Predator XB271HU display and a Pixel 2 camera on images including considerable amounts of white (snow). The results show that the disclosed LFM model and method is robust to overexposure and underexposure, provided that the pixels are not in saturation (low BER in either case). The method performs better for underexposed images than for overexposed images (in general) because the message cannot be easily recovered from saturated pixels in overexposed images (e.g., saturated snow pixels in the example of FIG. 8).

Still another test was performed to determine how well T ( ) generalizes to new camera-display pairs. Using the 1000-image, 1024-bit test dataset, two additional cameras and two additional displays were tested using i) a discrete cosine transform (DCT) algorithm; ii) the Baluja algorithm described above, iii) the light field messaging method with the CDTF model and frontal image capture (i.e., without T ( )); iv) the disclosed light field messaging method with T ( ) and image capture at 45° (camera-display); and v) the disclosed light field messaging method with T ( ) and frontal image capture. Table 2 shows the results of the tests (in terms of bit error rate (BER)), indicating that LFM trained with T ( ) significantly outperforms existing methods for the new camera-display pairs, even when camera and display are at a 45° angle.

TABLE 2

|  | Sony Cybershot DSC-RX100 & Lenovo Thinkpad X1 Carbon 3444-CUU | Sony Cybershot DSC-RX100 & Apple Macbook Pro 13-inch, Early 2011 | Nikon Coolpix S6000 & Lenovo Thinkpad X1 Carbon 3444-CUU | Nikon Coolpix S6000 & Apple Macbook Pro 13-inch, Early 2011 |
|---|---|---|---|---|
| DCT, frontal | 50.01% | 50.127% | 50.001% | 49.949% |
| Baluja, frontal | 40.372% | 37.152% | 48.497% | 48.827% |
| LFM, without T( ), frontal | 50.509% | 49.948% | 50.0005% | 49.9975 |
| LFM, with T( ), 45° angle | 12.974% | 15.591% | 27.434% | 25.811% |
| LFM, with T( ), frontal | 9.1688% | 7.313% | 20.454% | 17.555% |

The results above demonstrate that the disclosed method of light field messaging LFM with a CDTF model (T ( )) significantly outperforms existing deep-learning and fixed-filter steganography approaches, yielding the best BER scores for every camera-display combination tested. This method is robust to camera exposure settings and camera-display angle, with LFM at 45° outperforming all other methods at 0° camera-display viewing angles. The low error rate of the disclosed LFM method opens exciting avenues for new applications and learning-based approaches to photographic steganography. Moreover, the disclosed method can be implemented as a single-frame synchronization-free methodology, with ordinary display hardware without high frequency requirements. Accordingly, an important benefit of the disclosed method is that it employs spatial encoding and does not rely on detection of changes in images over time, removing the need to synchronize image production and image capture in the time domain. It is noted that the models trained using data from the specific set of cameras and displays generalize to cameras and displays not included in the training set It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of light messaging in which a hidden message is transmitted in a coded image emitted from a display device and retrieved from the coded image using a camera, comprising:
    training a camera-display transfer model that receives images coded with hidden messages from an embedding model and generates modified coded images that simulate camera-display distortion based upon training image data, the modified coded images being delivered to a recovery model that is configured to decode the hidden messages from the modified coded images and to output hidden message determinations;
    training both the embedding and the recovery models using the prior-trained CDTF model and the training image data to minimize a difference between the input hidden messages and the hidden message determinations;
    after training the CDTF model, embedding and recovery models:
    embedding a further hidden message in a carrier image using the trained embedding model, transforming the carrier image into a coded image;
    displaying the coded image using the display device;
    receiving the coded image at the camera; and
    retrieving the further hidden message embedded in the coded image using the trained recovery model.

2. The method of claim 1, wherein the CDTF model is implemented using a machine learning technique.

3. The method of claim 2, wherein the neural network implementing the CDTF model includes a neural network system having at least one convolutional neural network.

4. The method of claim 2, wherein the CDTF model is trained using a loss function that includes a perceptual metric.

5. The method of claim 1, wherein the training image data includes photographs taken by a plurality of cameras.

6. The method of claim 1, wherein the training image data includes images displayed on a plurality of display devices.

7. The method of claim 1, wherein the embedding model includes a first processing path for the message and a second processing path for carrier images into which the hidden messages are embedded.

8. The method of claim 7, wherein features of the carrier images and messages are shared by the first and second processing paths.

9. The method of claim 1, wherein the carrier image in which the coded image is displayed and captured using different display and camera devices than those from which the training image data is obtained.

10. The method of claim 1, wherein the coded images are encoded spatially by the embedding model such that time-based synchronization is not required to decode the code images using the recovery model.

11. A method of light messaging using a previously trained camera-display distortion model, including an embedding model configured to embed a hidden message into a carrier image and transform the carrier image into a coded image, a camera-display transfer model configured to receive the coded image from the embedding model and to generate a modified coded image that simulates camera-display distortion, and a recovery model configured to retrieve the hidden message from the modified coded image, the method comprising:
    receiving an image emitted by a display device in which a message has been embedded using the embedding model trained with the CDTF model;
    processing the received image through the recovery model trained with the CDTF model; and
    determining the hidden message.

12. The method of claim 11, wherein the embedding model, camera-display transfer model and recovery model are trained, using training image data, to minimize a difference between the hidden message embedded in the carrier image by the embedding model, and the message retrieved subject to the camera-display distortion simulated by the CDTF model.

13. A method of light messaging using a previously trained camera-distortion model including an embedding model configured to embed a hidden message into a carrier image and transform the carrier image into a coded image, a camera-display transfer model configured to receive the coded image from the embedding model and to generate modified coded images that simulate camera-display distortion based upon training image data, and a recovery model configured to retrieve the hidden message from the modified coded image, the method comprising:

embedding a further hidden message in a carrier image using the embedding model trained with the CDTF model, transforming the carrier image into a coded image; and     displaying the coded image using a display device.

14. A method of light messaging in which a hidden message is transmitted in a coded image emitted from a display device and retrieved from the coded image using a camera, comprising:

training a camera-display transfer function model configured to receive the coded image from an embedding model and to generate modified coded images that simulate camera-display distortion based upon training image data, the modified coded images being delivered to a recovery model that is configured to decode the hidden messages from the modified coded images and to output hidden message determinations; and     training both the embedding model and the recovery model using the prior-trained CDTF model and the training image data to minimize a difference between the input hidden messages and the hidden message determinations.

15. The method of claim 14, wherein the CDTF model is implemented using a machine learning technique.

16. The method of claim 15, wherein the neural network implementing the CDTF model includes a neural network system having at least one convolutional neural network.

17. The method of claim 15, wherein the CDTF model is trained using a loss function that includes a perceptual metric.

18. The method of claim 14, wherein the coded images are encoded spatially by the embedding model such that time-based synchronization is not required to decode the code images using the recovery model.

19. A method of enabling light messaging in which a hidden message is transmitted in a coded image emitted from a display device and retrieved from the coded image using a camera, comprising:

obtaining training image data including images displayed by a plurality of display devices and captured by a plurality of camera devices; and     training a camera-display transfer model using a machine learning technique configured to simulate camera-display distortion based upon the obtained training image data.

20. The method of claim 19, further comprising determining an inverse of the trained camera-display transfer function.

\* \* \* \* \*